J. D. JOHNSTON.
CORN POPPER.
APPLICATION FILED FEB. 8, 1915.

1,178,520.

Patented Apr. 11, 1916.

Witnesses:
P. M. Stanton
C. Lindner

Inventor,
John D. Johnston, by
G. C. Kennedy.
Attorney.

UNITED STATES PATENT OFFICE.

JOHN D. JOHNSTON, OF BLACKHAWK COUNTY, IOWA.

CORN-POPPER.

1,178,520.     Specification of Letters Patent.     Patented Apr. 11, 1916.

Application filed February 8, 1915. Serial No. 6,777.

*To all whom it may concern:*

Be it known that I, JOHN D. JOHNSTON, a citizen of the United States of America, and a resident of Blackhawk county, Iowa, have invented certain new and useful Improvements in Corn-Poppers, of which the following is a specification.

Figure 1:
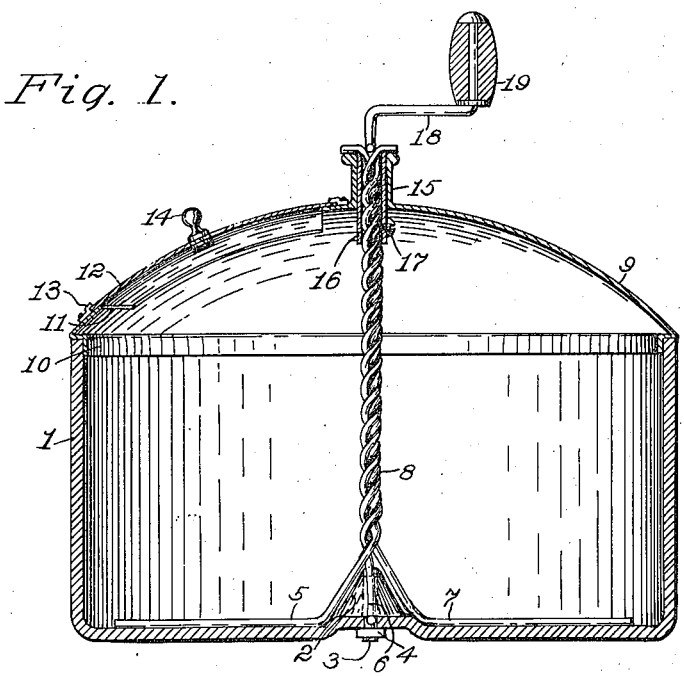
Figure 2:
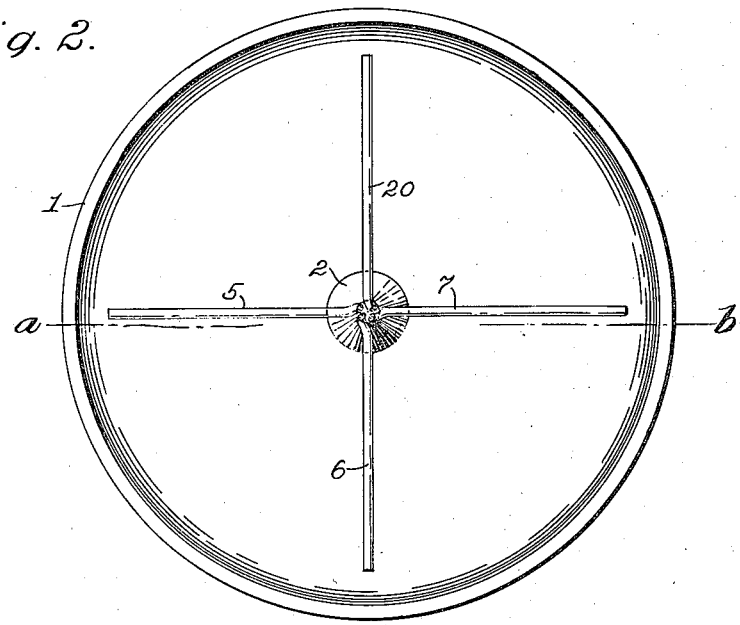

My invention relates to improvements in corn poppers, and the object of my improvement is to supply a portable device of this kind containing manually actuated stirring and scraping means for agitating the contents while in use and keeping same from scorching. This object I have accomplished by the means which are hereinafter described and claimed, and which are illustrated in the accompanying drawings, in which:

Figure 1 is a vertical central section of my improved device on the line *a—b* of Fig. 2, taken through the container and its cover only. Fig. 2 is a plan view of said device with the cover removed and the vertical shaft of the scraping arms broken away.

Similar numerals of reference denote corresponding parts through out the several views.

My improved device comprises a hollow cylindrical container 1, open at the top and closed at the bottom, and preferably made of heavy pressed metal.

The numeral 2 denotes a solid conical body secured on the center of the upper surface of the bottom of the container 1 by means of a bolt 3 and nut 4.

A dome-shaped cover 9 has an offset depending edge or flange 10 adapted to fit in and upon the upper edge of said container. Said cover 9 has a slotted opening 11, and a slide cover 12 is provided for said opening, also with a handle 14, and is slidable in slideways on said cover.

The numeral 15 denotes a hollow cylindrical or tubular projection centrally located and a part of the cover 9, extending upwardly. A sleeve 16 is rotatably mounted within said tubular projection 15 and is secured by means of a set-screw 17 or other fastening means to the shaft 8, the latter being passed through it to extend downwardly axially into the container 1.

The shaft 8 is formed from the twisted or interlaced rods 5, 6, 7 and 20, whose lower parts are spread divergently outwardly and downwardly to lie closely abutting upon the conical surface of the cone-shaped body 2, and then are bent radially outwardly and horizontally to extend along the bottom of the container 1 nearly to the vertical inner walls thereof. The upper ends of three of these rods are cut shorter than the fourth and are bent horizontally and outwardly to rest upon the upper end of the tubular projection of the cover. The fourth rod extends vertically upward a little farther than the others and is then bent to form a crank 18 upon which is mounted a rotatable handle part 19.

Operation: The portable container 1 may be placed on any stove or other heat producing means and pop-corn introduced through the opening 11 of the cover together with any seasoning desired. When the shaft 8 is rotated by means of the crank 18 and handle 19 the radially and horizontally extending rods 5, 6, 7 and 20 sweep in succession over the bottom of the container 1 keeping the pop-corn continually stirred up and in motion and preventing its becoming scorched or sticking thereto. The cone 2 with the sloping parts of said rods act to divert the corn from the center of the container so that the moving horizontal parts of the rods will gradually sweep it outwardly to the outer parts of the interior of the container which prevents the corn burning. The parts of the apparatus are easily assembled and disassembled, are portable, inexpensive and particularly adapted for family use.

Having described my invention, what I claim as new, and desire to secure by Letters Patent, is:

1. In combination, a vessel, a removable closure therefor, said vessel having a relatively large boss on the center of the upper surface of its bottom, and a plurality of rods connected above said boss, bent to conform themselves thereabout and then carried outwardly to sweep the upper surface thereof and of the bottom of the vessel.

2. In combination, a vessel having a conical central boss on the upper surface of its bottom, a closure for said vessel having a central bearing above said boss, a shaft rotatably mounted in said bearing to extend into the vessel nearly to said boss, and arms on the lower end of said shaft divergently seated about said boss and then extended outwardly therefrom to scrape over the bottom of the vessel when the shaft is rotated.

3. In combination, a vessel closed at the bottom and open at the top and having a conical central boss on the top surface of its bottom, a closure for said vessel having a port, a removable cover for said port, a shaft formed of a plurality of intertwined rods seated rotatably in said bearing to extend above and below it, the upper ends of certain of said rods being bent over to rest movably upon the bearing and another of the rods being formed into a crank, the rods being separated near the top of said boss, made divergent to sweep over the surface of the boss and then extended outwardly to lie along the bottom of the vessel and sweep over the same when rotated.

Signed at Waterloo, Iowa, this 25th day of Jan., 1915.

JOHN D. JOHNSTON.

Witnesses:
W. H. BRUNN,
G. C. KENNEDY.